(12) United States Patent
Mittendorf et al.

(10) Patent No.: US 8,118,989 B2
(45) Date of Patent: Feb. 21, 2012

(54) METHODS OF BONDING PURE RHENIUM TO A SUBSTRATE

(75) Inventors: Don Mittendorf, Mesa, AZ (US); Scott Sperl, Carefree, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/208,108

(22) Filed: Aug. 11, 2011

(65) Prior Publication Data

US 2011/0293845 A1 Dec. 1, 2011

Related U.S. Application Data

(62) Division of application No. 12/028,893, filed on Feb. 11, 2008, now Pat. No. 7,998,594.

(51) Int. Cl.
*C25D 5/50* (2006.01)
*C25D 3/00* (2006.01)
*C23C 16/06* (2006.01)
*C23C 14/34* (2006.01)
*C23C 4/08* (2006.01)

(52) U.S. Cl. ........ 205/187; 205/238; 205/227; 205/228; 204/192.15; 148/528; 148/529; 148/530; 148/537; 427/404; 427/405; 427/383.1; 427/250

(58) Field of Classification Search .................. None
See application file for complete search history.

(56) References Cited

U.S. PATENT DOCUMENTS

| | | | |
|---|---|---|---|
| 4,302,515 A | 11/1981 | DeCristofaro et al. | |
| 4,559,281 A | 12/1985 | Derfler et al. | |
| 4,931,152 A | 6/1990 | Naik et al. | |
| 5,054,682 A | 10/1991 | Mistry | |
| 5,704,538 A | 1/1998 | Mittendorf | |
| 5,935,351 A | 8/1999 | Sherman et al. | |
| 6,475,644 B1 | 11/2002 | Hampikian et al. | |
| 6,632,480 B2 | 10/2003 | Darolia et al. | |
| 6,746,782 B2 | 6/2004 | Zhao et al. | |
| 6,773,663 B2 | 8/2004 | Adams | |
| 6,846,261 B2 | 1/2005 | Lev et al. | |
| 6,979,392 B2 * | 12/2005 | Narita et al. | 205/238 |
| 6,987,339 B2 | 1/2006 | Adams et al. | |
| 7,041,384 B2 | 5/2006 | Mittendorf | |

(Continued)

OTHER PUBLICATIONS

USPTO Office Action for U.S. Appl. No. 12/028,893, Notification date Mar. 8, 2010.

(Continued)

*Primary Examiner* — Aaron Austin
(74) *Attorney, Agent, or Firm* — Ingrassia Fisher & Lorenz, P.C.

(57) ABSTRACT

Methods are provided for bonding pure rhenium to a substrate comprising a material. Non-lubricated components configured to have friction contact with another component are also provided. In an embodiment, by way of example only, a method includes disposing a eutectic alloy over the substrate to form an inter layer, the eutectic alloy comprised essentially of a base alloy and one or more melting point depressants and having a melting temperature that is lower than a melting temperature of the substrate material and a melting temperature of rhenium, placing pure rhenium over the inter layer, and heating the inter layer to a temperature that is substantially equal to or greater than the melting temperature of the eutectic alloy, but that is below the melting temperature of the substrate material and the melting temperature of the pure rhenium to bond the pure rhenium to the substrate.

18 Claims, 2 Drawing Sheets

U.S. PATENT DOCUMENTS 7,208,232 B1 4/2007 Gorman et al.
2008/0308425 A1* 12/2008 Mittendorf et al. ........... 205/187
2010/0221448 A1* 9/2010 Mittendorf et al. ........... 427/532

OTHER PUBLICATIONS

USPTO Office Action for U.S. Appl. No. 12/028,893, Notification date Jul. 9, 2010.

USPTO Office Action for U.S. Appl. No. 12/028,893, Notification date Nov. 9, 2010.

USPTO Notice of Allowance and Fee(s) Due for U.S. Appl. No. 12/028,893, Notification date Apr. 15, 2011.

USPTO Issue Notification for U.S. Appl. No. 12/028,893, Notification date Jul. 27, 2011.

* cited by examiner

METHODS OF BONDING PURE RHENIUM TO A SUBSTRATE

CROSS REFERENCE TO RELATED APPLICATION

This application is a divisional of application Ser. No. 12/028,893 filed on Feb. 11, 2008, now U.S. Pat. No. 7,998,594.

TECHNICAL FIELD

The inventive subject matter generally relates to rhenium, and more particularly relates to methods of bonding pure rhenium to a substrate.

BACKGROUND

One or more power transmission devices may be implemented into a machine to transmit or share power between one component and another. The power transmission device may include a shaft that is used to couple components within a machine via one or more gears, splines or linkage arrangements. Any suitable machine component capable of operating in response to rotational motion may be coupled to the shaft. In one example, the machine may be part of an aircraft, and may be coupled to a shaft this is driven by a jet engine. In another example, an electromechanical actuator may deliver rotational motion to the shaft, which then selectively deploys or retracts a thrust reverser assembly of the aircraft.

To reduce wear and heat generation during operation of the power transmission device, a lubrication system may be employed. In one type of lubrication system, the gears or shaft may be made of or coated with a self-lubricating material. Recently, it has been discovered that pure rhenium has superior lubricating properties over other self-lubricants. However, practical methods of coating pure rhenium onto certain substrate materials, such as nickel-based alloys, cobalt-based alloys, iron-based alloys, and steel, are not known. Although components could be made entirely of pure rhenium, such an option may not be available in applications in which cost may be a constraint.

Accordingly, it is desirable to have a method for coating pure rhenium onto a substrate. In addition, it is desirable for the method to be relatively low cost and simple to perform. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods are provided for bonding pure rhenium to a substrate comprising a material. Non-lubricated components configured to have friction contact with another component are also provided.

In an embodiment, by way of example only, the method includes disposing a eutectic alloy over the substrate to form an inter layer, the eutectic alloy comprised essentially of a base alloy and one or more melting point depressants and having a melting temperature that is lower than a melting temperature of the substrate material and a melting temperature of rhenium, placing pure rhenium over the inter layer, and heating the inter layer to a temperature that is substantially equal to or greater than the melting temperature of the eutectic alloy, but that is below the melting temperature of the substrate material and the melting temperature of the pure rhenium to bond the pure rhenium to the substrate.

In another embodiment, by way of example only, the method includes performing an electroless nickel-plating process on the substrate with a eutectic alloy to form an inter layer, the eutectic alloy consisting essentially of nickel and one or more melting point depressants and having a melting temperature that is lower than a melting temperature of the substrate material and a melting temperature of rhenium, depositing pure rhenium over the inter layer, and heating the inter layer to a temperature that is substantially equal to or greater than the melting temperature of the eutectic alloy, but that is below the melting temperature of the substrate material and the melting temperature of the pure rhenium to bond the pure rhenium to the substrate.

In still another embodiment, a component includes a substrate, an inter layer, and an outer layer. The inter layer is disposed over the substrate and comprises a eutectic alloy consisting essentially of nickel and one or more melting point depressants. The outer layer consists essentially of rhenium having a purity of at least 99%, by weight.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
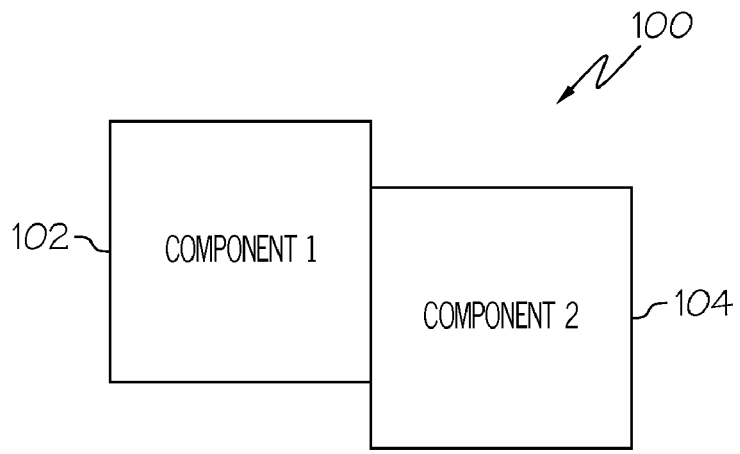
FIG. 1 is a simplified schematic of a machine system, according to an embodiment.

FIG. 1 is a simplified schematic of a machine system 100 according to an embodiment. The machine system 100 may be implemented into any one of various types of vehicles in which a first component 102 and a second component 104 are contacted against each other while subjected to extreme contact stress (e.g., at least 50 ksi) and/or extreme pressure-velocity values (e.g., at least 750,000 psi-ft/min.). Examples of such systems include, but are not limited to power transmission systems, valve systems, and engine systems. In an embodiment, the first and second components 102, 104 may be two splined shafts, two meshed gears, a bearing and an inner raceway, a bearing and an outer raceway, a bushing on a shaft, or any other components that contact and move against each other.

Figure 2:
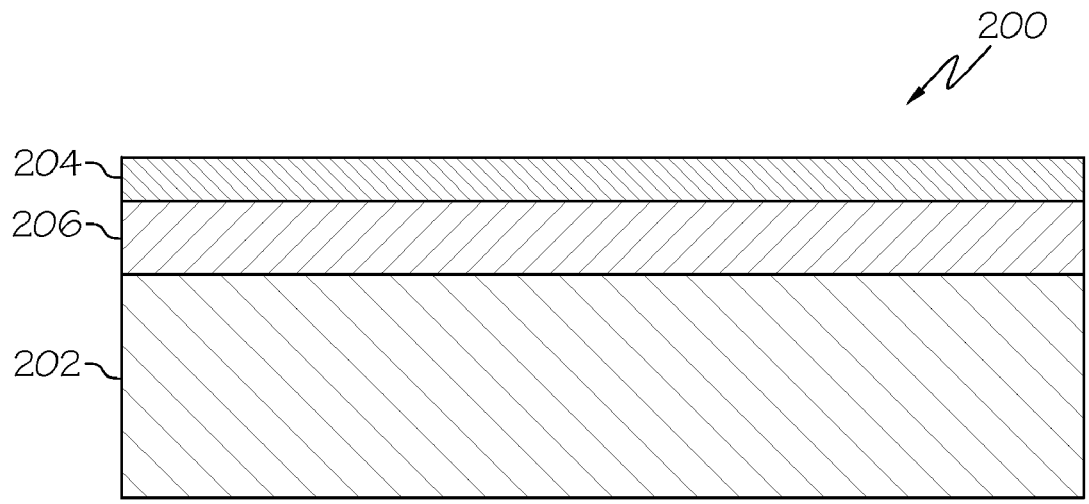
FIG. 2 is a cross-sectional, close-up view of a portion of a component of a machine system, according to an embodiment.

To prevent galling and seizing of the first and second components 102, 104 when subjected to the aforementioned conditions, the first and second components 102, 104 may include a non-lubricating material. For example, the first and second components 102, 104 may have outer surfaces that may be coated with the non-lubricating material. A cross-sectional view of a portion of a non-lubricated component 200 that may for a portion of either or both of the first and/or the second components 102, 104 is provided in FIG. 2. The non-lubricated component 200 may include a substrate 202 and an outer layer 204, and an inter layer 206 therebetween. The substrate 202 may be made of any material conventionally used for splines, gears, bearing assembly components, or bushings. Suitable materials include, but are not limited to nickel, cobalt, iron, and alloys thereof. In an embodiment, the substrate 202 may have a thickness of between about 1.5 mm and about 25.0 mm. In other embodiments, the substrate 202 may be thinner or thicker.

The outer layer 204 is disposed over the substrate 202 to provide improved wear-resistance, gall-resistance, and self-lubricating abilities, when subjected to extreme contact stress (e.g., at least 50 ksi) and extreme pressure-velocity values (e.g., at least 750,000 psi-ft/min.). In an embodiment, the outer layer 204 comprises substantially pure rhenium. "Pure rhenium" as used herein, may be defined as rhenium having a purity of at least 99%, by weight. In an embodiment, the pure rhenium has a purity of at least 99%, by weight, and may include incidental impurities in trace amounts. In another embodiment, the pure rhenium has a purity of at least 99.99%, by weight. In still another embodiment, the pure rhenium has a purity of 100%, by weight. The outer layer 204 may have a thickness of between about 0.20 mm and about 1.30 mm. However, in other embodiments, the outer layer 204 may be thinner or thicker, depending on a particular magnitude of contact stress and/or a particular pressure-velocity value to which the outer layer 204 may be subjected.

The inter layer 206 bonds the outer layer 204 to the substrate 202 and comprises a eutectic alloy that may include a base alloy and one or more melting point depressants. In an embodiment, the base alloy is selected to be chemically compatible with the substrate material and the material comprising the outer layer 204 (e.g., rhenium). For example, the base alloy may be nickel, as nickel is capable of bonding to conventionally-used substrate materials (e.g., nickel-based alloys, cobalt-based alloys, iron-based alloys, etc.) and is soluble in rhenium. In other embodiments, different elements may be selected as the base alloy. The one or more melting point depressants are selected to allow the eutectic alloy to have a melting temperature that is lower than a melting temperature of the substrate material and a melting temperature of rhenium. Additionally, the particular depressant selected may depend on the base alloy to be included in the eutectic alloy. For example, in a formulation in which nickel is used as the base alloy, suitable melting point depressants include phosphorus and boron. In other examples, other melting point depressants may alternatively be used.

The eutectic alloy may include the base alloy and the melting point depressants at any ratio suitable to form a eutectic, where "eutectic" is defined as a composition for a binary alloy system where an equilibrium melting temperature is below that of either or both of the alloy and depressant in pure form (e.g. greater than 99% purity) and where both phases of the alloy and the depressant melt at the same temperature. For example, in an embodiment, a nickel/phosphorus eutectic alloy may include between about 7.0 and about 14.0% phosphorus by weight, with a balance of nickel. In another embodiment, a nickel/boron eutectic alloy may include between about 3.0 and about 6.0% boron by weight. It will be appreciated that in embodiments in which other elements are selected as the base alloy and melting point depressants, the concentration of each may be different.

The inter layer 206 may be thinner than the outer layer 204, in an embodiment. For example, the inter layer 206 may have a thickness of between about 0.0003 mm and about 0.005 mm. In other embodiments, it will be appreciated that the inter layer 206 may be thicker or thinner than the ranges mentioned.

Figure 3:
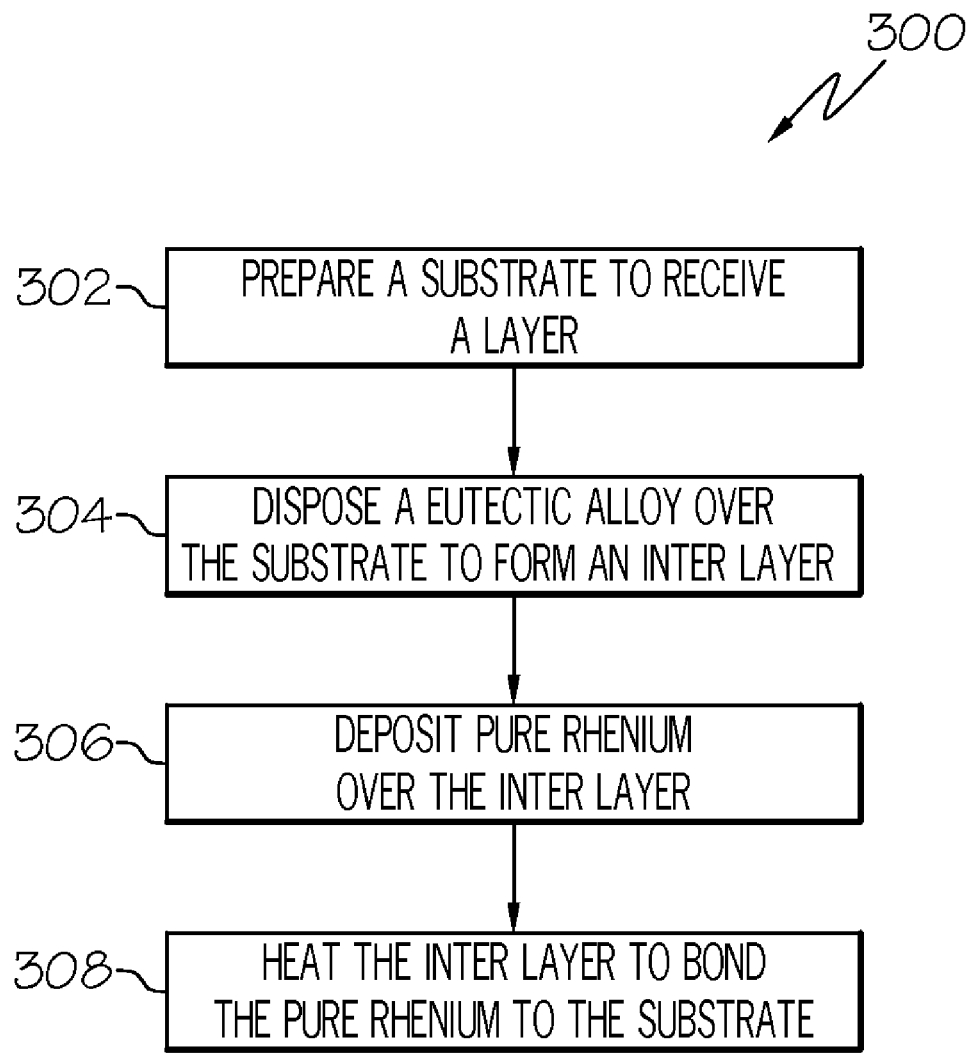
FIG. 3 is a flow diagram of a method of bonding pure rhenium to a substrate, according to an embodiment.

To ensure that the outer layer 204 is suitably bonded to the substrate 202, method 300 depicted in FIG. 3 may be employed. In an embodiment, a substrate is prepared to receive a layer thereon, step 302. A eutectic alloy is disposed over the substrate to form an inter layer, step 304. Then, pure rhenium is placed over the inter layer to form an outer layer, step 306. The inter layer is then heated to bond the pure rhenium to the substrate, step 308. Each of these steps will now be discussed.

As briefly mentioned previously, the substrate may be prepared, step 302. In an embodiment, the substrate may comprise a material conventionally used in forming splines, gears, bearing assembly components, or bushings, such as steel, titanium-based alloys, nickel-based alloys, cobalt-based alloys, and/or iron-based alloys. The substrate may be an off-the-shelf component or may be a component that has been investment cast or otherwise formed into a desired shape. In embodiments in which subsequent steps include plating, a nickel strike may be deposited onto selected surfaces of the substrate.

Next, a eutectic alloy is disposed over on the substrate to form the inter layer, step 304. In an embodiment, the eutectic alloy is plated onto the substrate. For example, an electroless nickel may be used as the eutectic alloy and may be electroless nickel plated to the substrate. In another example, the eutectic alloy may be electrolytically plated to the substrate. In another embodiment, the eutectic alloy may be deposited on to the substrate. Suitable deposition processes include, but are not limited to chemical processes, such as chemical vapor deposition, or physical processes, such as physical vapor deposition, electron beam deposition, and sputtering. In still another embodiment, the eutectic alloy may be formed on the substrate. For example, in an embodiment in which the substrate comprises a nickel-based alloy, the substrate may be subjected to boriding to transform at least an outer surface of the substrate into a nickel-boron eutectic alloy inter layer. Ion implantation or packing processes may be used in these embodiments. In any case, a suitable amount of the eutectic alloy is disposed over the substrate until a desired thickness is achieved.

Pure rhenium is then placed over the inter layer to form an outer layer, step 306. The pure rhenium may be deposited using any deposition process. Suitable deposition processes include chemical vapor deposition, physical vapor deposition, electroplating (aqueous or hot salt), sputtering, and flame spraying. However, other deposition processes may alternatively be used. No matter the particular process, step 306 is performed until a desired thickness of pure rhenium is deposited over the inter layer.

The inter layer is then heated to bond the outer layer of pure rhenium to the substrate, step 308. In an embodiment, the component having the inter layer and pure rhenium thereon is placed in a furnace and heated. In another embodiment, heating may be localized, and a laser or torch may alternatively be used. In such case, the laser or torch may be directed at a particular portion of the component to thereby heat at least a selected portion of the inter layer.

The component and/or the inter layer may be heated to a temperature that is substantially equal to or greater than the melting temperature of the eutectic alloy, but that is below the melting temperature of the substrate material and rhenium. For example, in an embodiment in which the eutectic alloy includes nickel and phosphorus, the heating may be at a temperature within a range of between about 900° C. and about 1150° C. In an embodiment in which the eutectic alloy includes nickel and boron, the heating may be at a temperature within a range of between about 1110° C. and about 1200° C. It will be appreciated that other temperature ranges may alternatively be employed, as long as the eutectic alloy melts and the substrate material and rhenium remain solid. Heating may also be performed for a duration that is suitable for at least a portion of the base alloy of the eutectic alloy to sufficiently diffuse into the pure rhenium outer layer and into the substrate material. For example, heating may occur for between about 1 and about 4 hours.

As a result of the heating, the base material making up the inter layer, such as the nickel, diffuses into the substrate material and the pure rhenium outer layer to thereby bond the two together. Because the melting point depressant in the inter layer allows the temperature of the inter layer to be lower than that of the substrate material and the pure rhenium, the substrate material and the pure rhenium remain solid, while the inter layer becomes a liquid. In this way, the material of the inter layer diffuses more rapidly into the substrate and outer layer. In addition, liquid penetration into asperities in the substrate and outer layer may occur.

Methods have now been provided for coating pure rhenium onto a substrate. Not only are the methods relatively inexpensive and simple to perform, but they may form a bond between the rhenium and the substrate that may be capable of withstanding extreme contact stresses (e.g., at least 50 ksi) and extreme pressure-velocity values (e.g., at least 750,000 psi-ft/min.). Additionally, as is known, pure rhenium and the substrate may have different coefficients of thermal expansion; however, the methods described above may be used to create bonds where the rhenium and the substrate structurally can withstand the differences.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of bonding pure rhenium to a substrate comprising a material, the method comprising the steps of:
   disposing a eutectic alloy over the substrate to form an inter layer, the eutectic alloy consisting essentially of a base alloy and one or more melting point depressants and having a melting temperature that is lower than a melting temperature of the substrate material and a melting temperature of rhenium;
   placing pure rhenium over the inter layer; and
   heating the inter layer to a temperature that is substantially equal to or greater than the melting temperature of the eutectic alloy, but that is below the melting temperature of the substrate material and the melting temperature of the pure rhenium to bond the pure rhenium to the substrate.

2. The method of claim 1, wherein the step of disposing comprises performing an electroless nickel-plating process with the eutectic alloy to form the inter layer.

3. The method of claim 1, wherein the step of disposing comprises performing an electroplating process with the eutectic alloy to form the inter layer.

4. The method of claim 1, wherein the step of disposing comprises depositing the eutectic alloy onto the substrate using a chemical or a physical deposition process.

5. The method of claim 1, wherein the step of disposing comprises forming the eutectic alloy on the substrate.

6. The method of claim 5, wherein forming the eutectic alloy on the substrate comprises boriding the substrate to transform a portion thereof into the eutectic alloy thereby forming the inter layer.

7. The method of claim 1, wherein the base alloy comprises nickel and the one or more melting point depressants comprises phosphorus.

8. The method of claim 1, wherein the base alloy comprises nickel and the one or more melting point depressants comprises boron.

9. The method of claim 1, wherein the substrate comprises a material selected from the group consisting of a titanium-based alloy, a nickel-based alloy, a cobalt-based alloy, and an iron-based alloy.

10. The method of claim 1, wherein the step of disposing comprises chemical vapor depositing the pure rhenium over the inter layer.

11. The method of claim 1, wherein the step of disposing comprises physical vapor depositing the pure rhenium over the inter layer.

12. The method of claim 1, wherein the step of disposing comprises flame spraying the pure rhenium over the inter layer.

13. The method of claim 1, wherein the step of disposing comprises sputtering the pure rhenium over the inter layer.

14. The method of claim 1, wherein the step of placing pure rhenium over the inter layer comprises depositing material comprising at least 99% rhenium, by weight.

15. A method of forming a pure rhenium coating on a substrate comprising a material, the method comprising the steps of:
   performing an electroless nickel-plating process on the substrate with a eutectic alloy to form an inter layer, the eutectic alloy consisting essentially of nickel and one or more melting point depressants and having a melting temperature that is lower than a melting temperature of the substrate material and a melting temperature of rhenium;
   depositing pure rhenium over the inter layer; and
   heating the inter layer to a temperature that is substantially equal to or greater than the melting temperature of the eutectic alloy, but that is below the melting temperature of the substrate material and the melting temperature of the pure rhenium to bond the pure rhenium to the substrate.

16. The method of claim 15, wherein the substrate comprises a material selected from the group consisting of a titanium-based alloy, a nickel-based alloy, a cobalt-based alloy, and an iron-based alloy.

17. The method of claim 15, wherein the step of depositing pure rhenium comprises depositing material comprising at least 99% rhenium, by weight.

18. The method of claim 15, further comprising depositing a nickel strike onto the substrate, before the step of performing.

* * * * *